United States Patent
Wang et al.

(10) Patent No.: US 12,272,787 B2
(45) Date of Patent: Apr. 8, 2025

(54) SOLID-STATE ELECTROLYTE, SOLID-STATE BATTERY INCLUDING THE ELECTROLYTE, AND METHOD OF MAKING THE SAME

(71) Applicant: Samsung Electronics Co., Ltd., Suwon-si (KR)

(72) Inventors: Yan Wang, Brookline, MA (US); Lincoln Miara, Lincoln, MA (US); Jeong-Ju Cho, Lexington, MA (US); Sung-Kyun Jung, Gyeonggi-do (KR); Hyeokjo Gwon, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/203,705

(22) Filed: May 31, 2023

(65) Prior Publication Data
US 2023/0307702 A1  Sep. 28, 2023

Related U.S. Application Data

(63) Continuation of application No. 17/139,632, filed on Dec. 31, 2020, now Pat. No. 11,721,834.
(Continued)

(51) Int. Cl.
*H01M 10/0562* (2010.01)
*C01B 21/083* (2006.01)
(Continued)

(52) U.S. Cl.
CPC ....... *H01M 10/0562* (2013.01); *C01B 21/083* (2013.01); *H01M 4/382* (2013.01);
(Continued)

(58) Field of Classification Search
CPC .. H01M 10/0562; H01M 4/382; H01M 4/405; H01M 10/052; H01M 2004/027;
(Continued)

(56) References Cited

U.S. PATENT DOCUMENTS 10,446,872 B2   10/2019   Ceder et al.
10,566,653 B2   2/2020    Miara et al.
(Continued)

FOREIGN PATENT DOCUMENTS

| CN | 101821894 A | * | 9/2010 | .......... H01M 10/052 |
| CN | 107425218 A | | 12/2017 | |
| KR | 20170112033 A | * | 10/2017 | |

OTHER PUBLICATIONS

Wang, S. et al. "Lithium Chlorides and Bromides as Promising Solid-State Chemistries for Fast Ion Conductors with Good Electrochemical Stability", Angew. Chem. Int. Ed., vol. 58, 2019; pp. 8039-8043.

*Primary Examiner* — Daniel S Gatewood
(74) *Attorney, Agent, or Firm* — CANTOR COLBURN LLP

(57) ABSTRACT

A solid-state ion conductor includes a compound of Formula 1:

$$Li_{3a+b-(c*n)}N_aCl_bX_c \quad \text{Formula 1}$$

wherein, in Formula 1, X is an anion having an average oxidation state of n and is $-3 \leq n \leq -1$, and is at least one of Br, I, F, O, S, or P; and $1 \leq a \leq 4$, $1 \leq b \leq 3$, $0 < c \leq 3$, and $4.8 \leq (a+b+c) \leq 5.2$.

25 Claims, 13 Drawing Sheets

Related U.S. Application Data

(60) Provisional application No. 63/058,013, filed on Jul. 29, 2020.

(51) Int. Cl.
*H01M 4/02* (2006.01)
*H01M 4/38* (2006.01)
*H01M 4/40* (2006.01)
*H01M 10/052* (2010.01)

(52) U.S. Cl.
CPC ......... *H01M 4/405* (2013.01); *H01M 10/052* (2013.01); *C01P 2002/72* (2013.01); *C01P 2002/76* (2013.01); *C01P 2002/77* (2013.01); *C01P 2002/78* (2013.01); *C01P 2002/88* (2013.01); *C01P 2006/40* (2013.01); *H01M 2004/027* (2013.01); *H01M 2300/0068* (2013.01)

(58) Field of Classification Search
CPC ......... H01M 2300/0068; H01M 4/661; H01M 4/662; H01M 4/663; H01M 50/449; H01M 4/62; H01M 10/4235; H01M 50/434; H01M 2300/008; C01B 21/083; C01B 21/082; C01P 2002/72; C01P 2002/76; C01P 2002/77; C01P 2002/78; C01P 2002/88; C01P 2006/40; Y02E 60/10; C01D 15/00; H01B 1/06
See application file for complete search history.

(56) References Cited

U.S. PATENT DOCUMENTS

| | | | |
|---|---|---|---|
| 2016/0141580 A1* | 5/2016 | Sommer | H01M 50/437 429/144 |
| 2017/0047610 A1* | 2/2017 | Miara | H01M 10/052 |
| 2019/0148769 A1 | 5/2019 | Aihara et al. | |
| 2020/0161699 A1* | 5/2020 | Ito | C01G 53/42 |

* cited by examiner

Lithium Stoichiometry in $Li_{3a+b-(c*n)}Na_aCl_bX_c$

SOLID-STATE ELECTROLYTE, SOLID-STATE BATTERY INCLUDING THE ELECTROLYTE, AND METHOD OF MAKING THE SAME

CROSS-REFERENCE TO RELATED APPLICATION

This application is a continuation of U.S. patent application Ser. No. 17/139,632, filed on Dec. 31, 2020, which claims priority to U.S. Provisional Patent Application No. 63/058,013, filed on Jul. 29, 2020, in the United States Patent and Trademark Office, and all the benefits accruing therefrom under 35 U.S.C. § 119, the content of which is incorporated herein in its entirety by reference.

FIELD

Disclosed is a solid-state ion conductor, a component for a lithium battery including the solid-state ion conductor, a negative electrode including the solid-state ion conductor, a separator for a lithium battery including the solid-state ion conductor, a lithium battery including the solid-state ion conductor, and a method of preparing the solid-state ion conductor.

BACKGROUND

Lithium metal batteries can provide improved specific energy and energy density, and in some configurations improved power density. There has been increased focus on using lithium metal as a negative electrode to improve the energy density of batteries. However, the lithium conductivity of available solid-state electrolytes is significantly less than liquid alternatives. Furthermore, solid-state electrolytes that have high ionic conductivity (e.g., greater than 1 millisiemen per centimeter) are not stable in the presence of lithium metal. In addition, to provide improved safety, a material which provides improved stability to air would be desirable.

Thus there remains a need for an improved solid-state lithium electrolyte, and a method of preparing the same.

SUMMARY

A solid-state ion conductor includes a compound of Formula 1:

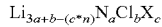

$$Li_{3a+b-(c \cdot n)}N_aCl_bX_c \quad \text{Formula 1}$$

wherein, in Formula 1, X is at least one of Br, I, F, O, S, or P, and n is an average oxidation state of X; and $1 \leq a \leq 4$, $1 \leq b \leq 3$, $0 \leq c \leq 3$, and $4.8 \leq (a+b+c) \leq 5.2$.

A component for a lithium battery includes a current collector; and
the solid-state ion conductor on a surface of the current collector.

A negative electrode includes a negative active material; and the solid-state ion conductor disposed on a surface of the negative active material.

A separator for a lithium battery includes a substrate; and the solid-state ion conductor disposed on a surface of the substrate.

A lithium battery includes a positive electrode; a negative electrode including lithium, a lithium alloy, or a combination thereof; and the solid-state ion conductor between the positive electrode and the negative electrode.

A method of preparing a solid-state ion conductor includes: providing a precursor mixture including a lithium precursor, a nitrogen precursor, a chlorine precursor, and an X precursor; treating the precursor mixture to prepare the compound of Formula 1; and disposing the compound of Formula 1 on the substrate to prepare the solid-state ion conductor.

The above described and other features are exemplified by the following figures and detailed description.

BRIEF DESCRIPTION OF THE DRAWINGS

The following figures are exemplary embodiments wherein the like elements are numbered alike.

DETAILED DESCRIPTION

A solid-state lithium battery includes a negative electrode, a positive electrode, and a solid-state electrolyte between the negative electrode and the positive electrode. It is understood that the positive electrode could alternatively be referred to as a cathode, and the negative electrode as an anode. A negative electrode active material of interest is lithium metal for its high theoretical capacity and low voltage. Similarly, a positive electrode active material of interest is high-voltage nickel-manganese-cobalt oxide (NMC) for its high capacity and promise for high volumetric energy density when used in a battery. Solid-state electrolytes have been studied for use with lithium metal negative electrodes in all-solid-state batteries. However, interposing a solid-state electrolyte between a lithium negative electrode and an NMC-based positive electrode poses a number of engineering challenges, including avoiding elemental interdiffusion between the positive electrode and solid-state electrolyte and volume changes that effect the mechanical integrity of the solid electrolyte-positive electrode interface.

Lithium nitride halides, e.g., $Li_9N_2Cl_3$, have been considered for use in a solid electrolyte. However, lithium nitride halides exhibit low ionic conductivity, e.g., less than $1\times10^{-3}$ millisiemens per centimeter (mS/cm), and are not stable in the presence of lithium, which make such materials impractical for use in lithium batteries. Thus, an improved lithium ion conductor is desired.

The present inventors have unexpectedly discovered that particular lithium nitride halide materials can provide improved lithium conductivity, specifically suitable conductivity at room temperature (e.g., at 23° C.), and improved stability towards lithium metal. The disclosed materials can be used to provide an improved lithium metal battery. The disclosed materials can further provide improved stability to air or moisture and can provide improved safety and stability, such as reduced likelihood of a short-circuit from a lithium metal dendrite.

Accordingly, an embodiment of the present disclosure is a solid-state ion conductor comprising a compound of Formula 1:

$$Li_{3a+b-(c*n)}N_aCl_bX_c \qquad \text{Formula 1}$$

wherein, in Formula 1, X is at least one of Br, I, F, O, S, or P, and n is an average oxidation state of X and is $-3\leq n\leq-1$; and $1\leq a\leq 4$, $1\leq b\leq 3$, $0<c\leq 3$, and $4.8\leq(a+b+c)\leq 5.2$.

Figure 2:
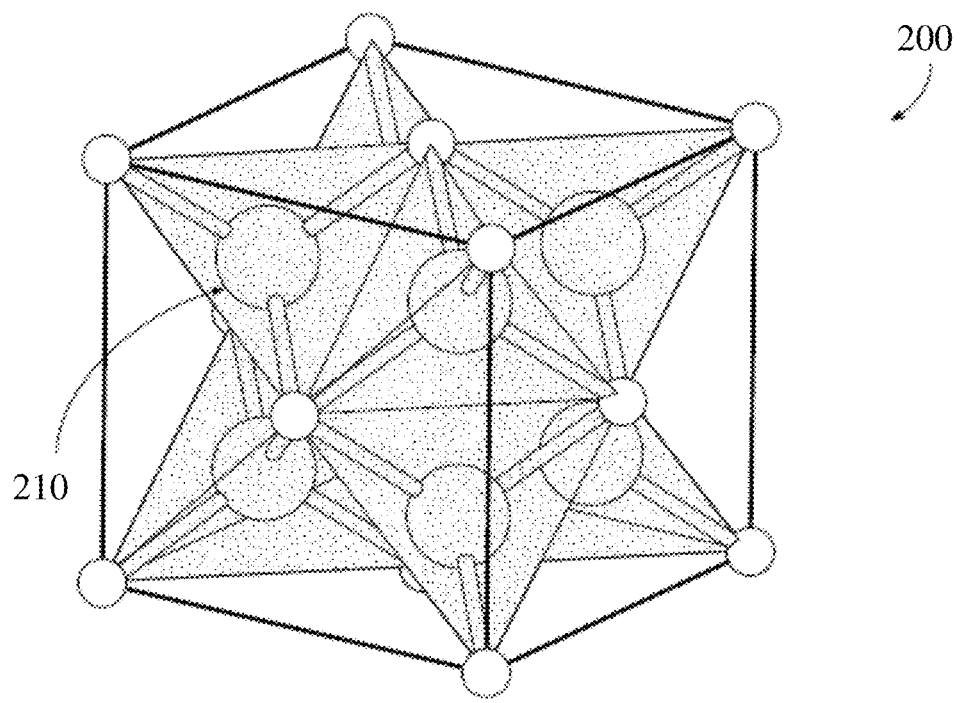
FIG. 2 is a schematic illustration of the antifluorite structure of an embodiment having face-centered cubic structure.

In an embodiment, for example as shown in FIG. 2, the solid-state ion conductor comprising the compound of Formula 1 has an antifluorite structure 200, wherein N, Cl, and X form a face-centered cubic structure. As illustrated in FIG. 2, the antifluorite structure 200 may contain a vacancy on a lithium site 210 in the crystal structure. While not wanting to be bound by theory, it is understood that including a lithium vacancy, such that a portion of the lithium sites 210 do not contain lithium, results in improved conductivity.

The solid-state ion conductor comprising the compound of Formula 1 can have an ionic conductivity equal to or greater than of $1\times10^{-6}$ siemens per centimeter (S/cm), at 25° C. For example, the solid-state ion conductor comprising the compound of Formula 1 may have an ionic conductivity of $1\times10^{-6}$ S/cm to $1\times10^{-1}$ S/cm, $1\times10^{-5}$ S/cm to $5\times10^{-2}$ S/cm, or $1\times10^{-4}$ S/cm to $1\times10^{-2}$ S/cm, at 25° C. Ionic conductivity may be determined by a complex impedance method at 20° C., further details of which can be found in J.-M. Winand et al., "Measurement of Ionic Conductivity in Solid Electrolytes," Europhysics Letters, vol. 8, no. 5, p. 447-452, 1989, the content of which is incorporated herein by reference in its entirety.

In an embodiment, the solid-state ion conductor comprising the compound of Formula 1 does not form an alloy or compound when contacted with lithium metal. Stated another way, the solid-state ion conductor comprising the compound of Formula 1 does not react with lithium metal and the solid-state ion conductor is stable when in contact with lithium metal. In an aspect, in a phase diagram containing lithium metal and the compound of Formula 1, lithium and the compound of Formula 1 are directly connected by a tie-line, with no compounds therebetween.

In an embodiment, in the solid-state ion conductor comprising the compound of Formula 1, n is an average oxidation state of X and is $-3\leq n\leq-1$. For example, in the solid-state ion conductor comprising the compound of Formula 1, $-3\leq n\leq -1$, $-2.8<n<-1.1$, $-2.6<n<-1.2$, or $-2.4<n<-1.3$.

In an embodiment, in the solid-state ion conductor comprising the compound of Formula 1, X is at least one of Br, I, F, O, S, or P. In the solid-state ion conductor comprising the compound of Formula 1, X being Br is mentioned.

In an embodiment, the solid-state ion conductor comprising the compound of Formula 1, c is $0<c\leq 2$. For example, in the solid-state ion conductor comprising the compound of Formula 1, $0.1<c\leq 2$, $0.2<c\leq 1.9$, $0.3<c\leq 1.8$, $0.4<c\leq 1.7$, or $0.5<c\leq 1.6$.

In a specific embodiment, the solid-state ion conductor may comprise at least one of $Li_9N_2Cl_{2.5}Br_{0.5}$, $Li_9N_2Cl_2Br_1$, $Li_9N_2Cl_{2.5}Br_{1.5}$, $Li_9N_2Cl_1Br_2$, $Li_9N_2Cl_{0.5}Br_{2.5}$, $Li_9N_2Cl_{1.5}Br_{1.5}$, $Li_9N_2Cl_{1.5}I_{1.5}$, $Li_9NCl_2O_2$, or $Li_9NCl_2O_2$, but is not limited to the foregoing.

The solid-state ion conductor may have a porosity of 0% (no pores) to less than 25%, based on a total volume of the solid-state ion conductor. The porosity may be, for example, 0% to less than 25%, 1% to 20%, 5% to 15%, or 7% to 12%, based on a total volume of the solid-state ion conductor. The porosity of solid-state ion conductor may be determined by scanning electron microscopy, the details of which can be determined by one of skill in the art without undue experimentation. Alternatively, porosity may be determined using nitrogen isotherms as disclosed in E. P. Barrett, L. G. Joyner, P. P. Halenda, "The determination of pore volume and area distributions in porous substances. I. Computations from nitrogen isotherms," J. Am. Chem. Soc. (1951), 73, 373-380, the details of which can be determined by one of skill in the art without undue experimentation.

A method for the manufacture of the solid-state ion conductor represents another embodiment of the present disclosure. The method includes providing a precursor mixture comprising a lithium precursor, a nitrogen precursor, a chlorine precursor, and an X precursor compound; and treating the precursor mixture to provide the compound of Formula 1; wherein the solid-state ion conductor comprises a compound represented by Formula 1, described previously. Representative lithium precursor compounds can include lithium oxide, lithium hydroxide, lithium nitrate, lithium chloride, lithium carbonate, lithium bromide, lithium azide, lithium oxalate, lithium peroxide, lithium acetate, lithium acetoacetate, or a combination thereof. Representative nitrogen precursor compounds can include lithium nitrate, lithium azide, lanthanum nitrate, zirconium nitrate, or aluminum nitrate. Representative chlorine precursor compounds can include potassium chloride, lithium chloride, or strontium chloride.

Representative X precursor compounds can include potassium chloride, lithium iodide, lithium fluoride, lithium chloride, lithium bromide, or strontium chloride.

Also disclosed are precursor compounds that provide a combination of lithium, nitrogen, or chlorine, and an X precursor, e.g., a halogen comprising a combination of lithium, nitrogen and chlorine.

Treating of the precursor mixture can comprise mechanochemically milling the precursor mixture. For example, the precursor mixture can be treated by ball milling using zirconia balls in a stainless steel container. The mechanochemically milling can be conducted under an inert atmosphere, such as argon, nitrogen, helium, or a combination thereof.

Treating of the precursor mixture may alternatively or additionally comprise heat-treating the precursor mixture, for example at a temperature of 25° C. to 800° C. For example, the heat-treating may comprise heat-treating the precursor mixture at a temperature of 25° C. to 800° C., 100° C. to 775° C., 200° C. to 750° C., or 300° C. to 700° C., preferably under an inert atmosphere. An inert atmosphere can be provided by any suitable inert gas, with non-limiting examples including argon, nitrogen, helium, or a combination thereof.

The disclosed method provides a solid-state ion conductor having desirable ionic conductivity and stability against lithium metal. The disclosed method can also provide a cost-effective method of making the solid-state ion conductor.

The solid-state ion conductor comprising the compound of Formula 1 can be disposed on a surface of a substrate, e.g., a current collector. The composition comprising the solid-state ion conductor may be disposed on the surface of a substrate, e.g., a current collector, using any suitable means, for example, using tape casting, slurry casting, screen printing, or by pressing the solid-state ion conductor on to a surface of the substrate. Additional details of tape casting and screen printing, for example suitable binders and solvents, can be determined by one of skill in the art without undue experimentation. Alternatively, the solid-state ion conductor may be due disposed on the substrate, e.g., the current collector, by sputtering using a sputtering target comprising the compound of Formula 1.

The current collector may comprise, for example, at least one of nickel, copper, titanium, stainless steel, or amorphous carbon. In an embodiment, the current collector can comprise amorphous carbon.

Another aspect of the present disclosure is a negative electrode. The negative electrode may comprise a negative active material and the solid-state conductor comprising the compound of Formula 1 disposed on a surface of the negative active material.

The negative active material may comprise a carbon, such as a hard carbon, soft carbon, carbon black, ketjen black, acetylene black, activated carbon, carbon nanotubes, carbon fiber, graphite, or an amorphous carbon. Also usable are lithium-containing metals and alloys, for example a lithium alloy comprising Si, Sn, Sb, or Ge. Lithium-containing metal oxides, metal nitrides, and metal sulfides are also useful. In particular, the use of Ti, Mo, Sn, Fe, Sb, Co, and V is mentioned, such as $Li_4Ti_5O_{12}$. Also useable are phosphorous (P) or metal doped phosphorous (e.g., $NiP_3$). The negative active material is not limited to the foregoing and any suitable negative active material can be used. The compound of Formula 1 may be disposed on a surface of the negative active material by sputtering, for example. Use of lithium metal as the negative active material is mentioned.

In an embodiment, the negative electrode may further comprise a binder. The binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the negative active material.

In an embodiment, a separator for a lithium battery comprises a substrate and the solid-state ion conductor comprising the compound of Formula 1 disposed on a surface of the substrate. In an aspect, the compound of Formula 1 may be disposed in a pore of the substrate. The substrate may be any suitable material. For example, the substrate may comprise a polymer such as nylon, polyester, polyethylene, polypropylene, poly(tetrafluoroethylene), or polyvinyl chloride, a ceramic such as $TiO_2$ or yttria stabilized zirconia, or a glass such as a borosilicate glass. A combination comprising at least one of the foregoing may be used. Also, the substrate may have any suitable form, and may be nonwoven or woven material, or in the form of a film, e.g., a microporous film. Use of microporous polyethylene, microporous polypropylene, or a composite thereof is mentioned. The compound of Formula 1 may be disposed on a surface thereof, e.g. on an exterior surface, or on an interior surface, such as in a pore of the substrate.

The solid-state ion conductor disclosed herein can be incorporated into a lithium battery. Thus, another aspect of the present disclosure is a lithium battery comprising a positive electrode; a negative electrode comprising lithium, a lithium alloy, or a combination thereof; and the solid-state ion conductor comprising the compound of Formula 1 between the positive electrode and the negative electrode.

The positive electrode can be prepared by forming a positive active material layer including a positive active material on a current collector. The current collector may comprise aluminum, for example. The positive electrode may be prepared by screen printing, slurry casting, or powder compression of the positive active material on the current collector to provide the positive electrode. However, the method of preparing the positive electrode is not limited thereto, and any suitable method may be used.

The positive active material can comprise a lithium transition metal oxide, or a transition metal sulfide. For example, the positive active material can be a compound represented by any of the Formulas: $Li_aA_{1-b}M_bD_2$ wherein $0.90 \le a \le 1.8$ and $0 \le b \le 0.5$; $Li_aE_{1-b}M_bO_{2-c}D_c$ wherein $0.90 \le a \le 1.8$, $0 \le b \le 0.5$, and $0 < c \le 0.05$; $LiE_{2-b}M_bO_{4-c}D_c$ wherein $0 \le b \le 0.5$ and $0 < c \le 0.05$; $Li_aNi_{1-b-c}Co_bM_cD_\alpha$ wherein $0.90 \le a \le 1.8$, $0 \le b \le 0.5$, $0 < c \le 0.05$, and $0 < \alpha < 2$; $Li_aNi_{1-b-c}Co_bM_cO_{2-\alpha}X_\alpha$ wherein $0.90 \le a \le 1.8$, $0 \le b \le 0.5$, $0 < c \le 0.05$, and $0 < \alpha < 2$; $Li_aNi_{1-b-c}CO_bM_cO_{2-\alpha}X_2$ wherein $0.90 \le a \le 1.8$, $0 \le b \le 0.5$, $0 < c \le 0.05$, and $0 < \alpha < 2$; $Li_aNi_{1-b-c}Mn_bM_cD_\alpha$ wherein $0.90 \le a \le 1.8$, $0 \le b \le 0.5$, $0 < c \le 0.05$, and $0 < \alpha < 2$; $Li_aNi_{1-b-c}Mn_bM_cO_{2-\alpha}X_\alpha$ wherein $0.90 \le a \le 1.8$, $0 \le b \le 0.5$, $0 < c \le 0.05$, and $0 < \alpha < 2$; $Li_aNi_{1-b-c}Mn_bM_cO_{2-\alpha}X_2$ wherein $0.90 \le a \le 1.8$, $0 \le b \le 0.5$, $0 < c \le 0.05$, and $0 < \alpha <$; $Li_aNi_bE_cG_dO_2$ wherein $0.90 \le a \le 1.8$, $0 \le b \le 0.9$, $0 < c \le 0.5$, and $0.001 \le d \le 0.1$; $Li_aNi_bCo_cMn_dGeO_2$ wherein $0.90 \le a \le 1.8$, $0 \le b \le 0.9$, $0 < c \le 0.5$, $0 \le d \le 0.5$, and $0.001 \le e \le 0.1$; $Li_aNiG_bO_2$ wherein $0.90 \le a \le 1.8$ and $0.001 \le b \le 0.1$; $Li_aCoG_bO_2$ wherein $0.90 \le a \le 1.8$ and $0.001 \le b \le 0.1$; $Li_aMnG_bO_2$ where $0.90 \le a \le 1.8$ and $0.001 \le b \le 0.1$; $Li_aMn_2GbO_4$ wherein $0.90 \le a \le 1.8$ and $0.001 \le b \le 0.1$; $QO_2$; $QS_2$; $LiQS_2$; $V_2O_5$; $LiV_2O_2$; $LiRO_2$; $LiNiVO_4$; $Li_{(3-f)}J_2(PO_4)_3$ ($0 \le f \le 2$); $Li_{(3-f)}Fe_2(PO_4)_3$ wherein $0 \le f \le 2$; and $LiFePO_4$, in which in the foregoing positive active materials A is Ni, Co, or Mn; M is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include $LiCoO_2$, $LiMn_xO_{2x}$ where x=1 or 2, $LiNi_{1-x}Mn_xO_{2x}$ where 0<x<1, $LiNi_{1-x-y}Co_xMn_yO_2$ where 0≤x≤0.5 and 0≤y≤0.5, $LiFePO_4$, $TiS_2$, $FeS_2$, $TiS_3$, and $FeS_3$. For example, the positive active material can include a composite oxide of lithium and a metal selected from cobalt, manganese, and nickel. Mentioned are NMC 811 ($LiNi_{0.8}Mn_{0.1}Co_{0.1}O_2$), NMC 622 ($LiNi_{0.6}Mn_{0.2}Co_{0.2}O_2$), NMC 532 ($LiNi_{0.5}Mn_{0.3}Co_{0.2}O_2$), and NCA ($LiNi_{0.8}Co_{0.15}Al_{0.05}O_2$).

The positive active material layer may further include a conductive agent and a binder. Any suitable conductive agent and binder may be used.

A binder can facilitate adherence between components of the electrode, such as the positive active material and the conductor, and adherence of the electrode to a current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the electrode to the current collector may be suitably strong.

The conductive agent can include, for example, carbon black, carbon fiber, graphite, carbon nanotubes, graphene, or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination comprising at least one of the foregoing conductive agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used.

The compound according to Formula 1 disposed between the positive and negative electrodes can serve as a solid electrolyte. In an aspect, the solid electrolyte may serve as a separator to electrically insulate the positive electrode from the negative electrode. In some embodiments, the compound according to Formula 1 can be disposed on a substrate or a separator in the lithium battery. Suitable substrates can be as described above. In some embodiments, other electrolytes, such as a liquid electrolyte or other solid-state electrolytes, can be excluded from the lithium battery of the present disclosure.

Figure 1:
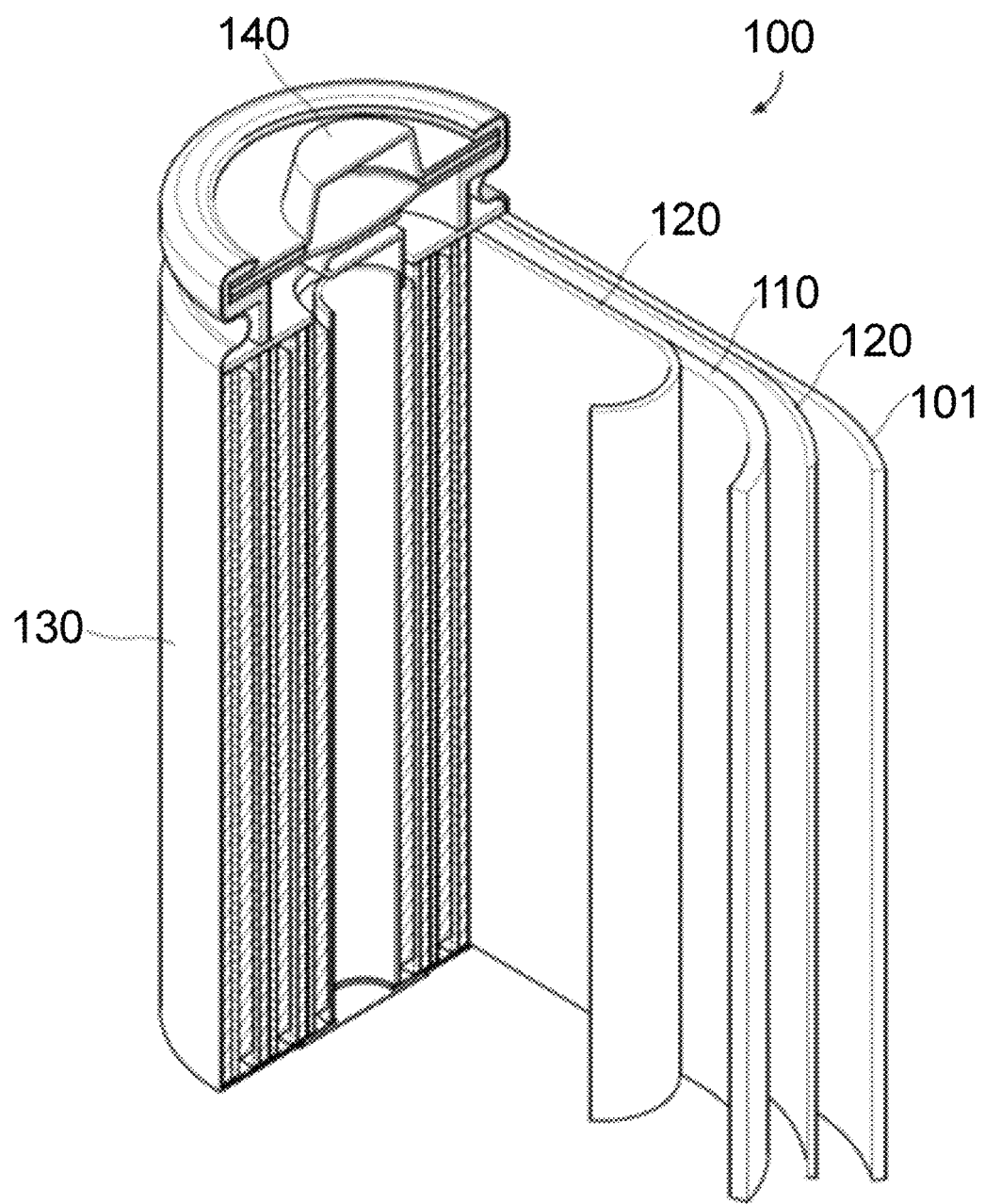
FIG. 1 is a schematic diagram of an embodiment of a lithium battery.

A schematic diagram of a lithium battery is provided in FIG. 1. As shown in the battery 100 of FIG. 1, the negative electrode 101 can be used in combination with a positive electrode 110 and an electrolyte layer 120 can be provided between the positive electrode and the negative electrode. The battery of FIG. 1 may comprise the solid-state ion conductor of the present disclosure. The negative electrode 101, the positive electrode 110, or an electrolyte layer 120 can each independently comprise the compound of Formula 1. Mentioned is use of an electrolyte layer comprising the compound of Formula 1. Also mentioned is use of a negative electrode 101 comprising the compound of Formula 1.

Figure 3:
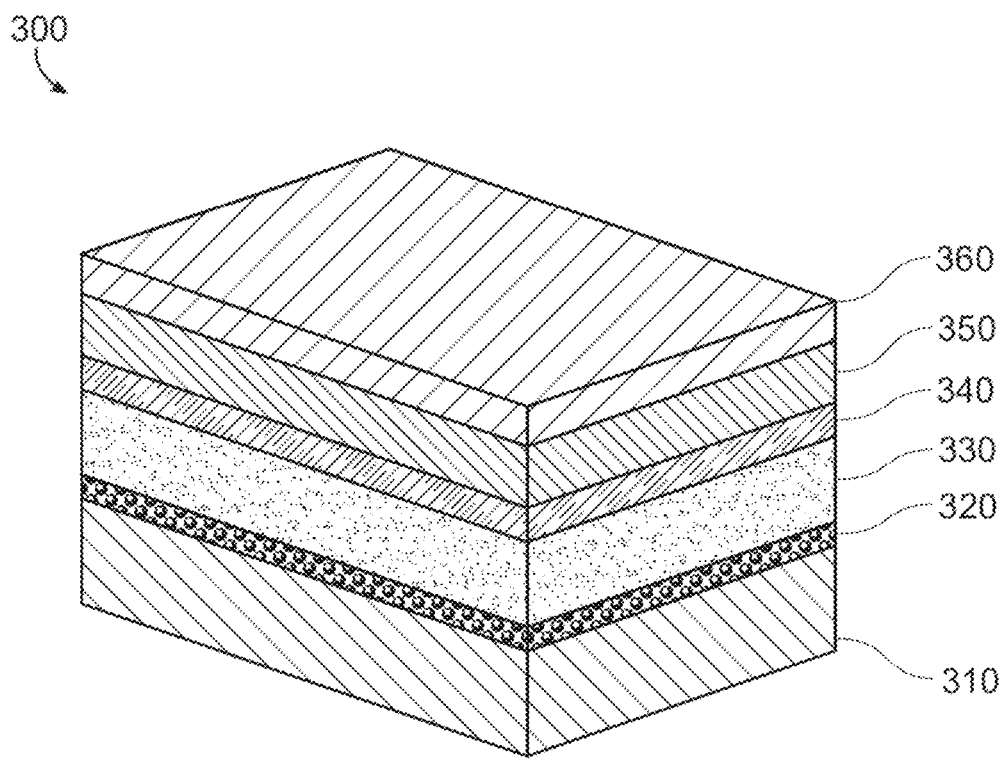
FIG. 3 is a schematic diagram of an embodiment of a lithium battery.

As shown in FIG. 3, a battery 300 may comprise a substrate 330 on a solid-state electrolyte layer 340. The substrate 330 or the solid-state electrolyte layer 340 may each independently comprises the compound according to Formula 1. Also shown in FIG. 3 is a positive electrode current collector 310, a positive electrode 320 comprising the positive electrode active material, a negative electrode 350 comprising the negative electrode active material, and a negative electrode current collector 360. In an aspect, the separator 330 may be omitted and the solid-state electrolyte layer 340 may be suitable to electrically separate the negative electrode 350 and the positive electrode 320.

Figure 4:
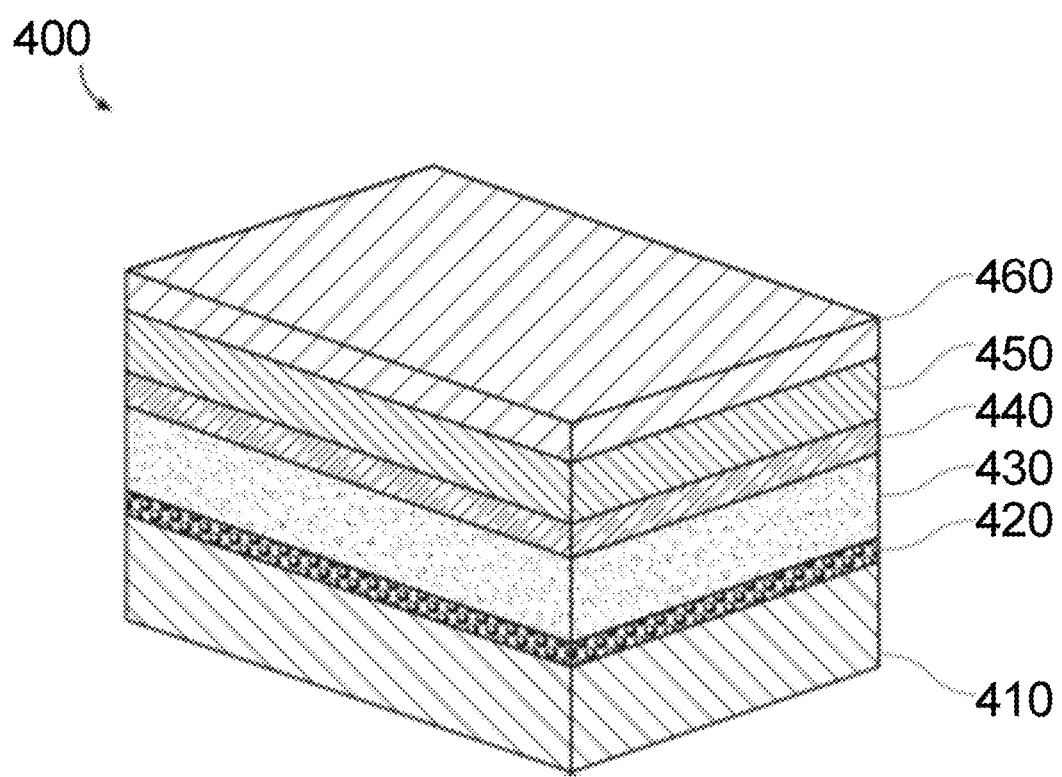
FIG. 4 is a schematic diagram of an embodiment of a lithium battery.

In an aspect, the solid ion conductor comprising the compound of Formula 1 can be useful as a negative active material protection layer. The negative active material protection layer, when present, can be disposed on the negative electrode and adjacent to a solid electrolyte. For example, as shown in FIG. 4, a battery 400 may comprise a solid electrolyte 430 adjacent to a negative active material protection layer 440 comprising the solid-state ion conductor including the compound according to Formula 1. Also shown in FIG. 4 is a positive electrode current collector 410, a positive electrode 420 comprising the positive electrode active material, a negative electrode 450 comprising that negative electrode active material, and a negative electrode current collector 460.

When present, the solid electrolyte in the solid electrolyte layer may be, for example, an inorganic solid electrolyte. The solid electrolyte in the solid electrolyte layer may be, for example, at least one of an oxide-containing solid electrolyte or a sulfide-containing solid electrolyte.

The solid electrolyte may be, for example, an oxide-containing solid electrolyte. Examples of the oxide-containing solid electrolyte may include at least one of $Li_{1+x+y}Al_xTi_{2-x}Si_yP_{3-y}O_{12}$ (where 0<x<2 and 0≤y<3), $BaTiO_3$, $Pb(Zr_aTi_{1-a})O_3$ (PZT) (where 0≤a≤1), $Pb_{1-x}La_xZr_{1-y}Ti_yO_3$ (PLZT) (where 0≤x<1 and 0≤y<1), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (where 0<x<2 and 0<y<3), $Li_xAl_yTi_z(PO_4)_3$ (where 0<x<2, 0<y<1, and 0<z<3), $Li_{1+x+y}(Al_aGa_{1-a})_x(Ti_bGe_{1-b})_{2-x}Si_yP_{3-y}O_{12}$ (where 0≤x≤1, 0≤y≤1, 0≤a≤1, and 0≤b≤1), $Li_xLa_yTiO_3$ (where 0<x<2 and 0<y<3), $Li_2O$, $LiOH$, $Li_2CO_3$, $LiAlO_2$, $Li_2O$—$Al_2O_3$—$SiO_2$—$P_2O_5$—$TiO_2$—$GeO_2$, and $Li_{3+x}La_3M_2O_{12}$ (where M is Te, Nb, or Zr, and 0≤x≤10). Also mentioned is $Li_7La_3Zr_2O_{12}$ (LLZO) or $Li_{3+x}La_3Zr_{2-a}M_aO_{12}$ (M-doped LLZO, where M is Ga, W, Nb, Ta, or Al, and 0≤x≤10 and 0≤a<2).

In an embodiment, the solid electrolyte may be a sulfide-containing solid electrolyte. Examples of the sulfide-containing solid electrolyte may include at least one of $Li_2S$—$P_2S_5$, $Li_2S$—$P_2S_5$—LiX (where X is a halogen element), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_m$ (where m and n each are a positive number, Z represents any of Ge, Zn, and Ga), $Li_2S$—$GeS_2$, $Li_2S$—$SiS_2$—$Li_3PO_4$, $Li_2S$—$SiS_2$—$Li_pMO_q$ (where p and q each are a positive number, M represents at least one of P, Si, Ge, B, Al, Ga, or In), $Li_{7-x}PS_{6-x}Cl_x$ (where 0≤x≤2), $Li_{7-x}PS_{6-x}Br_x$ (where 0≤x≤2), or $Li_{7-x}PS_{6-x}I_x$ (where 0≤x≤2).

Also, the sulfide-containing solid electrolyte may include at least sulfur (S), phosphorus (P), and lithium (Li), as component elements among the sulfide-containing solid electrolyte materials. For example, the sulfide-containing solid electrolyte may be a material including $Li_2S$—$P_2S_5$. Here, when the material including $Li_2S$—$P_2S_5$ is used as a sulfide-containing solid electrolyte material, a mixing molar ratio of $Li_2S$ and $P_2S_5$ ($Li_2S:P_2S_5$) may be, for example, selected in a range of about 50:50 to about 90:10.

For example, the sulfide-containing solid electrolyte may include an argyrodite-type solid electrolyte represented by Formula 2:

$$Li^+_{12-n-x}A^{n+}X^{2-}_{6-x}Y^-_x \qquad \text{Formula 2}$$

In Formula 2, A is at least one of P, As, Ge, Ga, Sb, Si, Sn, Al, In, Ti, V, Nb, or Ta, X is at least one of S, Se, or Te, Y is at least one of Cl, Br, I, F, CN, OCN, SCN, or $N_3$, $1 \leq n \leq 5$, and $0 \leq x \leq 2$.

The sulfide-containing solid electrolyte may be an argyrodite-type compound including at least one of $Li_{7-x}PS_{6-x}Cl_x$ (where $0 \leq x \leq 2$), $Li_{7-x}PS_{6-x}Br_x$ (where $0 \leq x \leq 2$), or $Li_{7-x}PS_{6-x}I_x$ (where $0 \leq x \leq 2$). Particularly, the sulfide-containing solid electrolyte in the solid electrolyte layer may be an argyrodite-type compound including at least one of $Li_6PS_5Cl$, $Li_6PS_5Br$, or $Li_6PS_5I$.

The solid electrolyte may be prepared by a sintering method, by melting and quenching starting materials (e.g., $Li_2S$ or $P_2S_5$), or by mechanical milling. The solid electrolyte may be amorphous or crystalline. A mixture may be used.

The solid electrolyte layer may include a binder. Examples of the binder in the solid electrolyte layer may include styrene butadiene rubber (SBR), polytetrafluoroethylene, polyvinylidene fluoride, or polyethylene, but embodiments are not limited thereto, and any suitable binder may be used. The binder of the solid electrolyte may be the same as or different from a binder of the cathode active material layer and the first anode active material layer.

The lithium battery can be manufactured by providing a positive electrode, providing a negative electrode, and disposing the solid-state ion conductor comprising the compound according to Formula 1 between the positive electrode and the negative electrode. The method can optionally further comprise disposing a separator between the positive and the negative electrodes. For example, the lithium battery can be manufactured by sequentially laminating the negative electrode, the solid-state ion conductor comprising the compound according to Formula 1, and the positive electrode; winding or folding the laminated structures, then enclosing the wound or folded structure in a cylindrical or rectangular battery case or pouch to provide the lithium battery.

This disclosure is further illustrated by the following examples, which are non-limiting.

EXAMPLES

In each of the examples that follow, all chemicals were used as received without further purification. $Li_3N$ (≥99%), LiCl (≥99%), and LiBr (≥99%) were purchased from SIGMA-ALDRICH and yttrium-doped zirconia (YSZ) substrates were purchased from MTI CORPORATION. The precursor compounds were dried in a vacuum oven at 180° C. prior to preparing the precursor mixture.

Example 1. Preparation of $Li_9N_2Cl_3$ by Mechanochemical Milling

A precursor mixture was prepared by mechanochemical milling, using a planetary ball mill operating at 700 rpm for 12 hours under argon gas, stoichiometric ratios of the Li, N, and Cl salts to form a solid-state ion conductor of the formula $Li_9N_2Cl_3$. The precursor mixture was disposed on the surface of a 1 cm×1 cm yttria-stabilized zirconia (YSZ) substrate to form a solid-state ion conductor. The substrate was maintained at room temperature (25° C.) during deposition of the precursor mixture.

Figure 5:
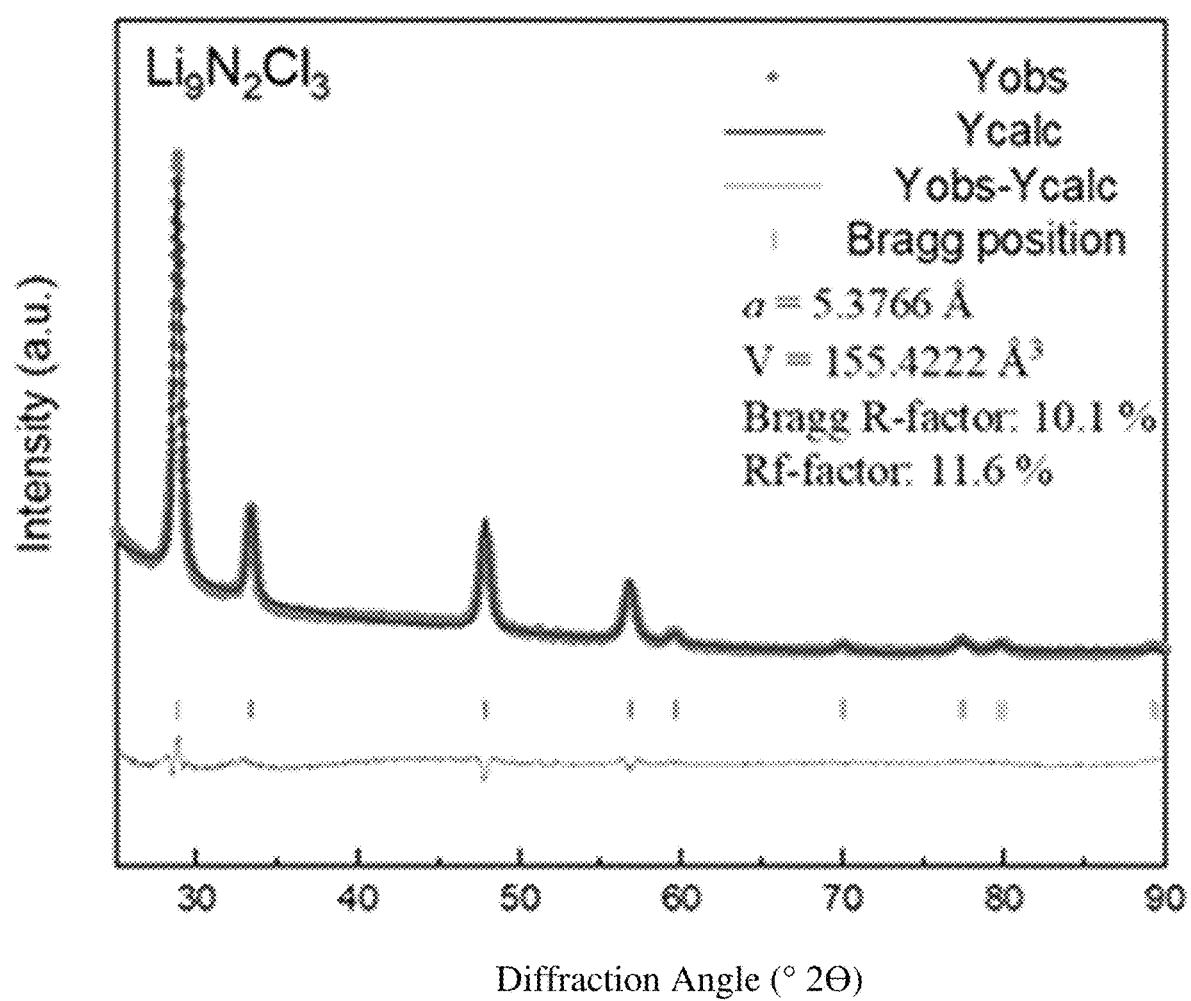
FIG. 5 is a graph of intensity (arbitrary units) versus diffraction angle (° 2θ) that shows the results of powder X-ray diffraction (XRD) analysis, using Cu Kα radiation, of $Li_9N_2Cl_3$.

The substrate comprising the $Li_9N_2Cl_3$ was analyzed by X-ray powder diffraction (XRD). The results of the XRD analysis are shown in FIG. 5, which show peaks consistent with $Li_9N_2Cl_3$. Shown are the observed diffractions, those expected based on calculation, and the difference between the actual and calculated results.

Example 2. Preparation of $Li_9N_2Cl_{1.5}Br_{1.5}$ by Mechanochemical Milling

Using the same method mechanochemical milling of Example 1, stoichiometric ratios of the Li, N, Cl, and Br salts were used to prepare $Li_9N_2Cl_{1.5}Br_{1.5}$. The precursor mixture was disposed on to the surface of a 1 cm×1 cm YSZ substrate to form a solid-state ion conductor. The substrate was maintained at room temperature (25° C.) during deposition of the precursor mixture.

Figure 6:
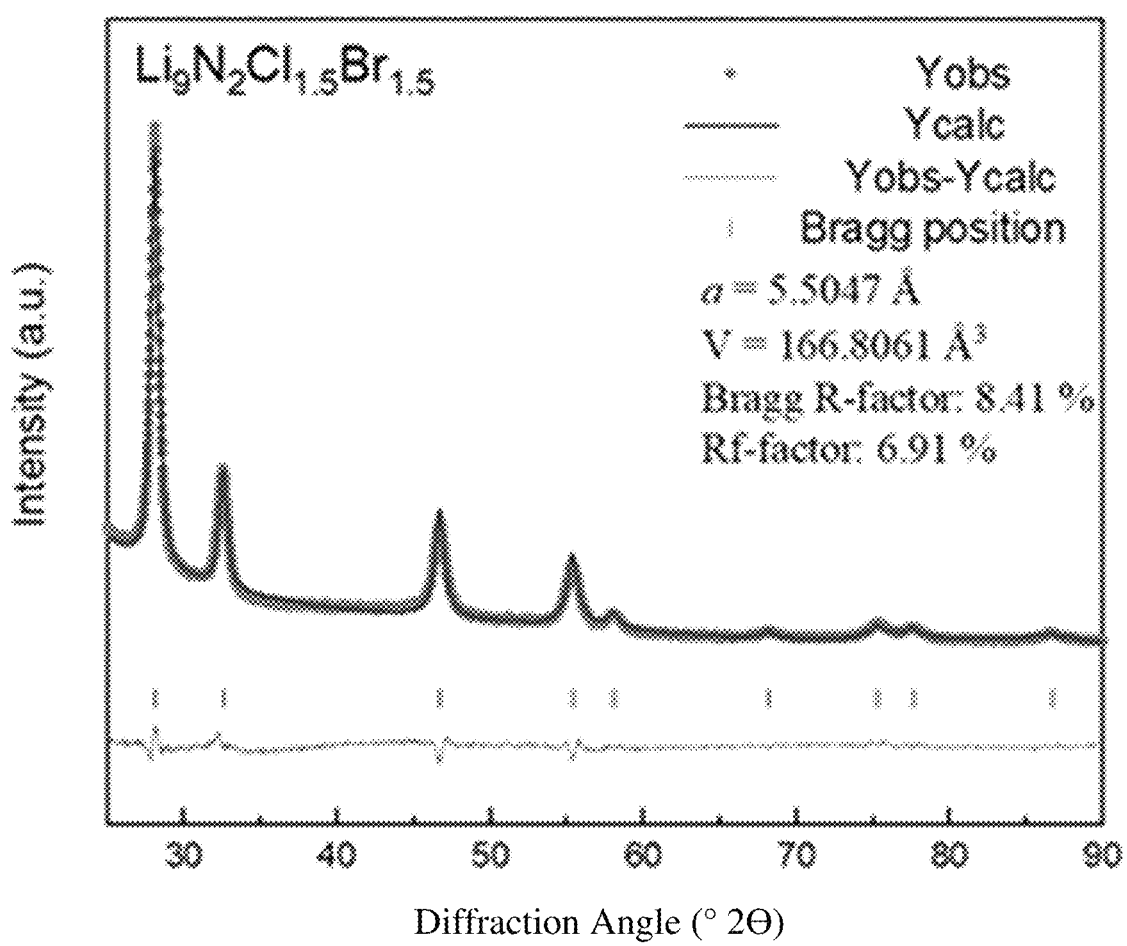
FIG. 6 is a graph of intensity (arbitrary units) versus diffraction angle (° 2θ) that shows the results of powder X-ray diffraction (XRD) analysis, using Cu Kα radiation, of $Li_9N_2Cl_{1.5}Br_{1.5}$.

XRD analysis, the results of which are shown in FIG. 6, show that $Li_9N_2Cl_{1.5}Br_{1.5}$ was prepared.

Example 3. Preparation of $Li_9N_{2.25}Cl_{2.75}$ by Mechanochemical Milling

Using the same method mechanochemical milling of Example 1, stoichiometric ratios of the Li, N, and Cl salts were used to prepare $Li_9N_{2.25}Cl_{2.75}$. The precursor mixture was disposed on to the surface of a 1 cm×1 cm YSZ substrate to form a solid-state ion conductor. The substrate was maintained at room temperature (25° C.) during deposition of the precursor mixture.

Figure 7:
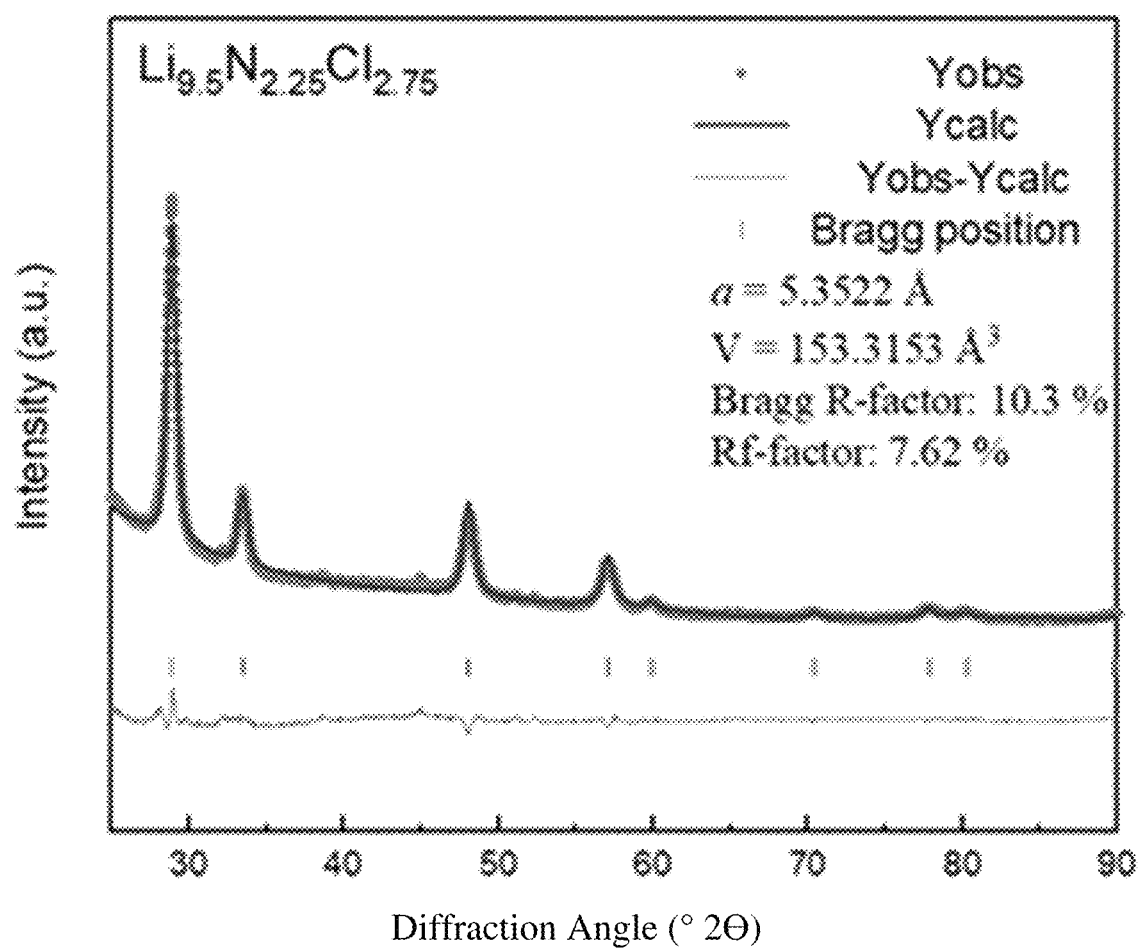
FIG. 7 is a graph of intensity (arbitrary units) versus diffraction angle (° 2θ) that shows the results of powder X-ray diffraction (XRD) analysis, using Cu Kα radiation, of $Li_{9.5}N_{2.25}Cl_{2.75}$.

The substrate comprising the $Li_9N_{2.25}Cl_{2.75}$ was analyzed using XRD. As shown in FIG. 7 peaks for $Li_9N_{2.25}Cl_{2.75}$ are observed.

Example 4. Preparation of $Li_{9.5}N_{2.25}Cl_{1.375}Br_{1.375}$ by Mechanochemical Milling Using the same method mechanochemical milling of Example 1, stoichiometric ratios of the Li, N, Cl, and Br salts were used to prepare $Li_{9.5}N_{2.25}Cl_{1.375}Br_{1.375}$. The precursor mixture was disposed on to the surface of a 1 cm×1 cm YSZ substrate to form a solid-state ion conductor. The substrate was maintained at room temperature (25° C.) during deposition of the precursor mixture.

Figure 8:
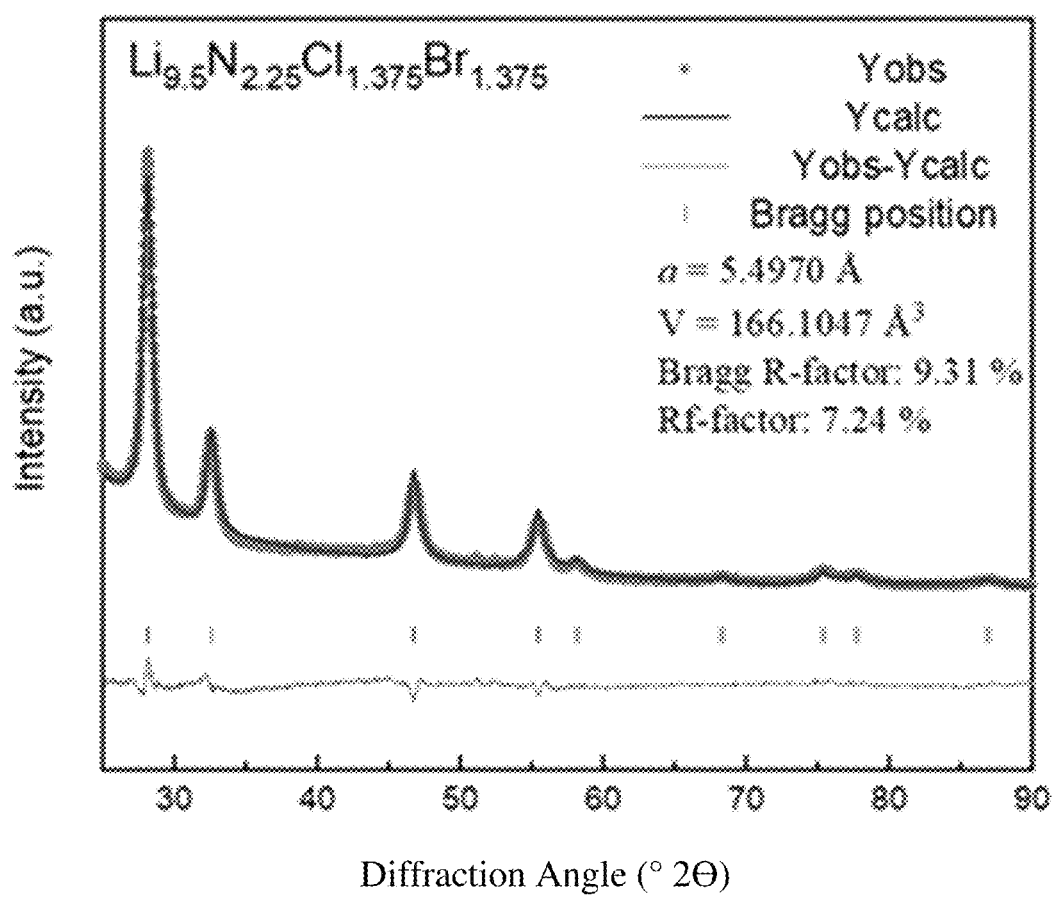
FIG. 8 is a graph of intensity (arbitrary units) versus diffraction angle (° 2θ) that shows the results of powder X-ray diffraction (XRD) analysis, using Cu Kα radiation, of $Li_{9.5}N_{2.25}Cl_{1.375}Br_{1.375}$.

The substrate comprising the $Li_{9.5}N_{2.25}Cl_{1.375}Br_{1.375}$ was analyzed using XRD. As shown in FIG. 8, peaks for $Li_{9.5}N_{2.25}Cl_{1.375}Br_{1.375}$ are observed.

Example 5. Preparation of $Li_{10}N_{2.5}Cl_{2.5}$ by Mechanochemical Milling

Using the same method mechanochemical milling of Example 1, stoichiometric ratios of the Li, N, and Cl were used to prepare $Li_{10}N_{2.5}Cl_{2.5}$. The precursor mixture was disposed on to the surface of a 1 cm×1 cm YSZ substrate to form a solid-state ion conductor. The substrate was maintained at room temperature (25° C.) during deposition of the precursor mixture.

Figure 9:
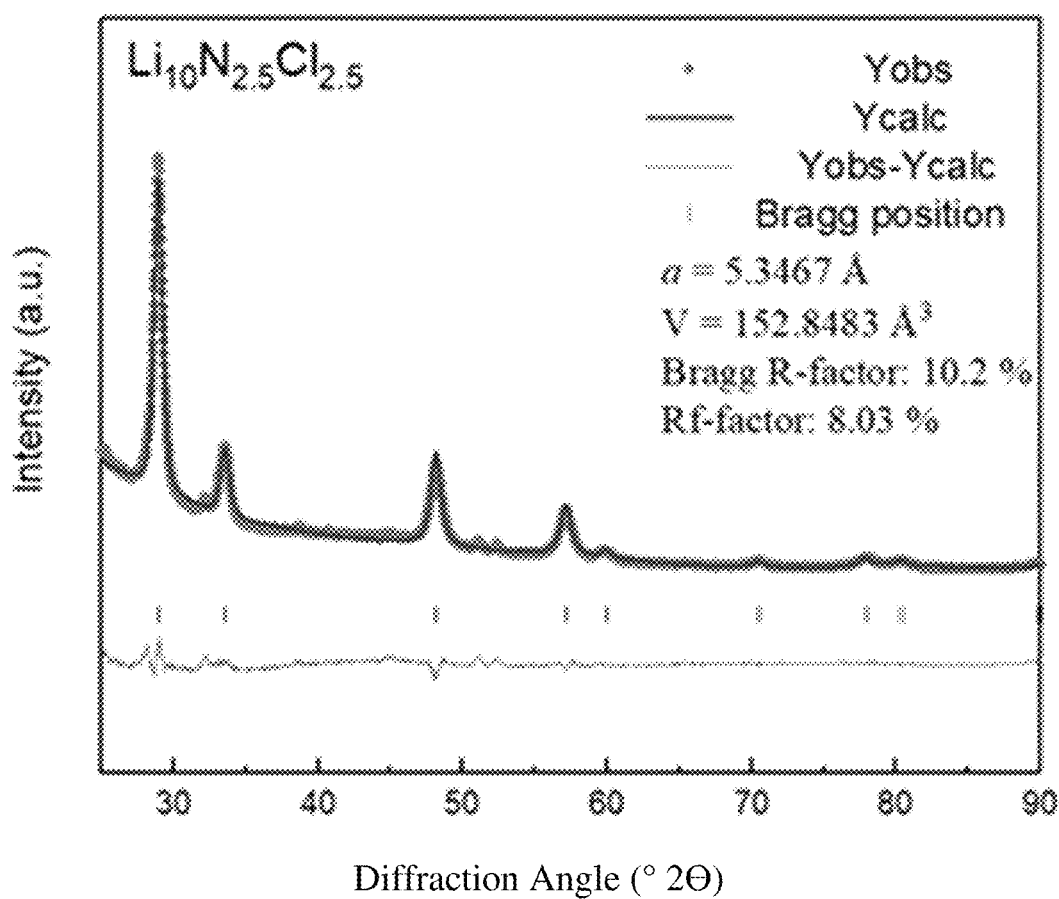
FIG. 9 is a graph of intensity (arbitrary units) versus diffraction angle (° 2θ) that shows the results of powder X-ray diffraction (XRD) analysis, using Cu Kα radiation, of $Li_{10}N_{2.5}Cl_{2.5}$.

The substrate comprising the $Li_{10}N_{2.5}Cl_{2.5}$ was analyzed using XRD. As shown in FIG. 9, peaks for $Li_{10}N_{2.5}Cl_{2.5}$ are observed.

Example 6. Preparation of $Li_{10}N_{2.5}Cl_{1.25}Br_{1.25}$ by Mechanochemical Milling Using the same method mechanochemical milling of Example 1, stoichiometric ratios of the Li, N, Cl, and Br were used to prepare $Li_{10}N_{2.5}Cl_{1.25}Br_{1.25}$. The precursor mixture was disposed on to the surface of a 1 cm×1 cm YSZ substrate to form a solid-state ion conductor. The substrate was maintained at room temperature (25° C.) during deposition of the precursor mixture.

Figure 10:
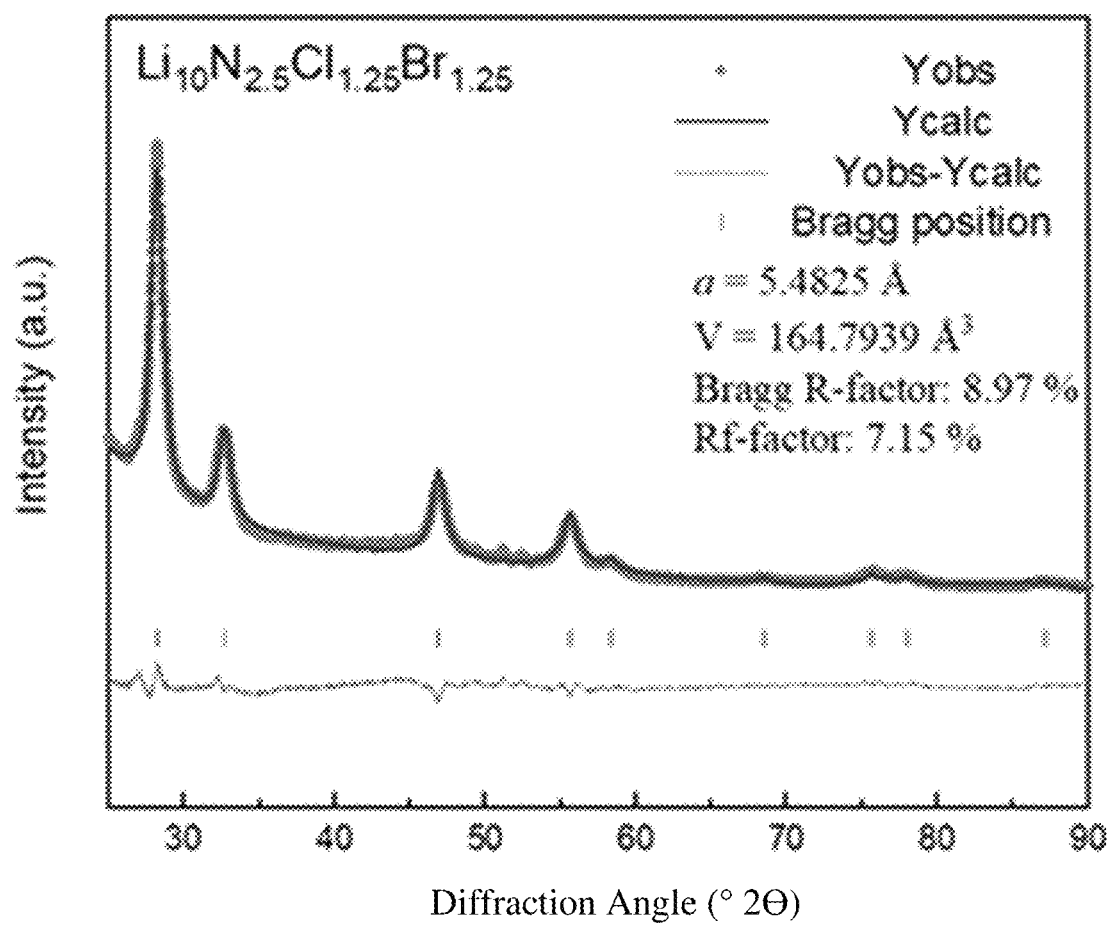
FIG. 10 is a graph of intensity (arbitrary units) versus diffraction angle (° 2θ) that shows the results of powder X-ray diffraction (XRD) analysis, using Cu Kα radiation, of $Li_{10}N_{2.5}Cl_{1.25}Br_{1.25}$.

The substrate comprising the $Li_{10}N_{2.5}Cl_{1.25}Br_{1.25}$ was analyzed using XRD. As shown in FIG. 10, peaks for $Li_{10}N_{2.5}Cl_{1.25}Br_{1.25}$ are observed.

Lattice Parameter Analysis

Figure 11:
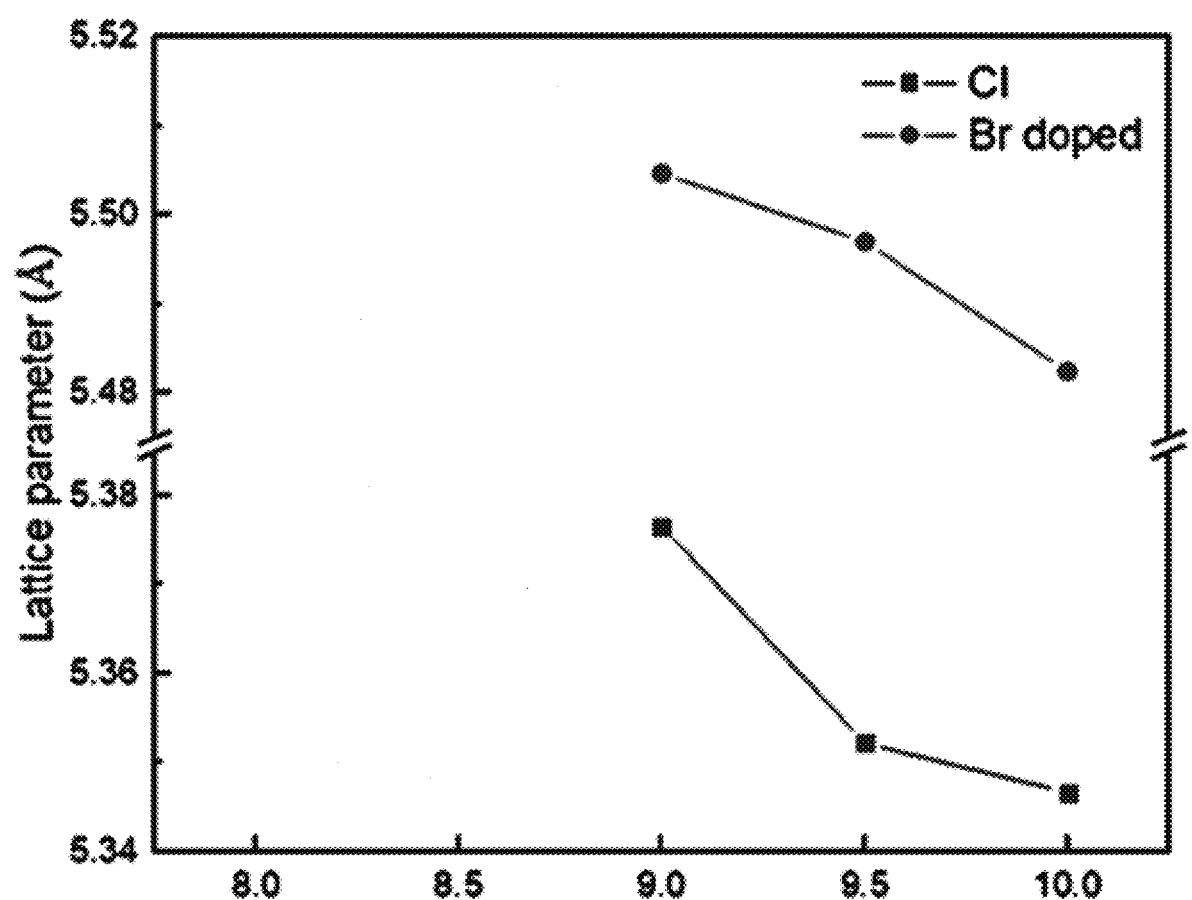
FIG. 11 is a graph of lattice parameter (angstroms (Å)) versus lithium content (Li stoichiometry in Formula 1) for compounds having varying amounts of lithium and bromine.

FIG. 11 is a graph of the lattice parameter of the compounds prepared in Examples 1 to 6 versus the lithium stoichiometry. The lattice parameters were determined by refinement of the XRD results. Refinement was done use FullProf software and Pseudo-Voigt function. Rietveld refinement was conducted for the phase with the parameters of scale factor, background, lattice parameter, zero shifts, and thermal parameters. The occupancy value of Li, N, and Cl was fixed. FIG. 11 illustrates that inclusion of Br results in an unexpected increase in the lattice parameter. While not wanting to be bound by theory, it is understood that the increased lattice parameter contributes to the improved ionic conductivity observed with the materials of Formula 1.

Arrhenius Analysis

Figure 12:
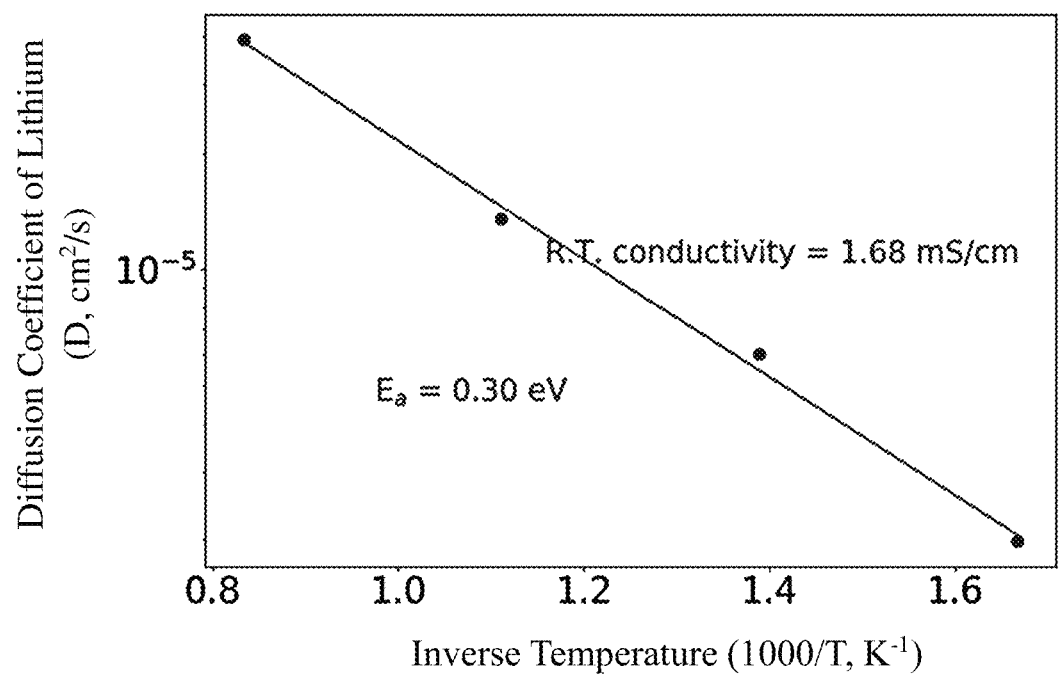
FIG. 12 is an Arrhenius plot and is a graph of the diffusion coefficient of lithium (D, cm²/s) versus inverse temperature (1000/T, K⁻¹), which illustrates the ionic conductivity of $Li_9N_2Cl_3$, at room temperature.
Figure 13:
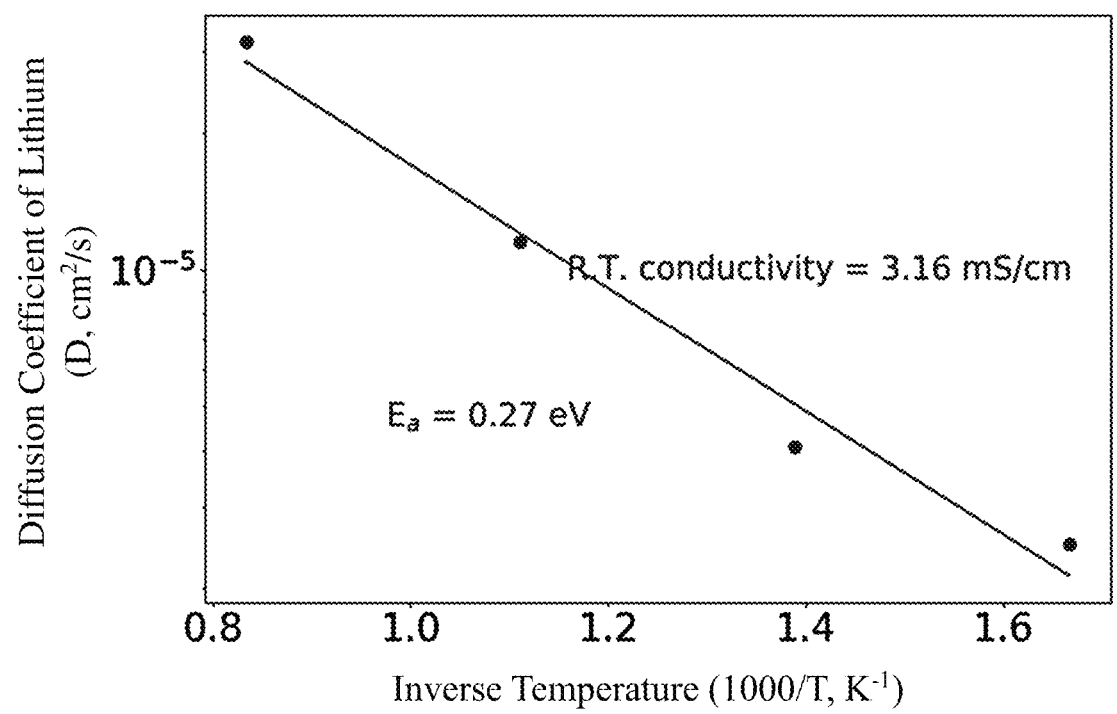
FIG. 13 is an Arrhenius plot and is a graph of the diffusion coefficient of lithium (D, cm²/s) versus inverse temperature (1000/T, K⁻¹), which illustrates the ionic conductivity of $Li_9N_2Cl_{1.5}Br_{1.5}$ at room temperature.

The ionic conductivity of $Li_9N_2Cl_3$ and $Li_9N_2Cl_{1.5}Br_{1.5}$ were determined by ab-initio molecular dynamics calculation using the Vienna Ab initio Simulation Package. Relevant parameters of the calculation include a projector augmented wave potentials with a kinetic energy cutoff of 400 eV, the exchange and correlation functionals of Perdew-Burke-Ernzerhof generalized gradient (GGA-PBE), and 200 picoseconds simulation time with a time step of 2 femtosecond. The results are shown in FIGS. 12 and 13, respectively. As shown, these materials are expected to have activation energies of 0.30 electron volts (eV) and 0.31 eV, respectively. When extrapolated to 300K, the conductivity of these materials is expected to be 1.68 mS/cm and 3.16 mS/cm, respectively. These results illustrate that inclusion of a dopant, e.g., X in Formula 1, such as Br in Examples 2, 4, and 6, provide an unexpected improvement in conductivity.

Various embodiments are shown in the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, or sections, these elements, components, regions, layers, or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" or "including" when used in this specification, specify the presence of stated features, regions, integers, steps, operations, elements, or components, but do not preclude the presence or addition of one or more other features, regions, integers, steps, operations, elements, components, or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

While a particular embodiment has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed:

1. A solid-state ion conductor comprising a compound of Formula 1:

$$Li_{3a+b-(c*n)}N_aCl_bX_c \quad \text{Formula 1}$$

wherein, in Formula 1,
X comprises an anion having an average oxidation state of n and is −2, and comprises S; and
1≤a≤4, 1≤b≤3, 0<c≤3, and 4.8≤(a+b+c)≤5.2.

2. The solid-state ion conductor of claim 1, wherein the compound of Formula 1 has an antifluorite structure, and wherein N, Cl, and X form a face-centered cubic structure.

3. The solid-state ion conductor of claim 2, wherein the antifluorite structure comprises a vacancy on a lithium site in the antifluorite structure.

4. The solid-state ion conductor of claim 1, wherein the solid-state ion conductor has an ionic conductivity equal to or greater than of $1\times10^{-6}$ siemens per centimeter, at 25° C.

5. The solid-state ion conductor of claim 4, wherein the solid-state ion conductor has an ionic conductivity of $1\times10^{-4}$ siemens per centimeter to $1\times10^{-2}$ siemens per centimeter, at 25° C.

6. The solid-state ion conductor of claim 1, wherein the solid-state ion conductor does not form an alloy or a compound when contacted with lithium metal.

7. The solid-state ion conductor of claim 1, wherein c is 0<c≤2.

8. The solid-state ion conductor of claim 1, wherein c is 0.1≤c<2.

9. The solid-state ion conductor of claim 1, wherein c is 0.5≤c≤2.

10. The solid-state ion conductor of claim 1, wherein a is 1 or 2.

11. The solid-state ion conductor of claim 1, wherein b is 0.5≤b≤2.5.

12. The solid-state ion conductor of claim 1, wherein a is 1 or 2, b is 0.5≤b≤2.5, and c is 0.5≤c≤2.

13. The solid-state ion conductor of claim 1, wherein X is an anion having an average oxidation state of n and is −2, and is S.

14. The solid-state ion conductor of claim 1, wherein X further comprises at least one of Br, I, F, O, or P.

15. The solid-state ion conductor of claim 1, wherein the compound of Formula 1 is $Li_9NCl_2S_2$.

16. The solid-state ion conductor of claim 1, wherein the solid-state ion conductor has a porosity of 0 to less than 25 volume percent, based on a total volume of the solid-state ion conductor.

17. A component for a lithium battery comprising:
a current collector; and
the solid-state ion conductor of claim 1 on a surface of the current collector.

18. The component of claim 17, wherein the current collector comprises at least one of nickel, copper, titanium, stainless steel, or amorphous carbon.

19. A negative electrode comprising:
a negative active material; and
the solid-state ion conductor of claim 1 disposed on a surface of the negative active material.

20. A separator for a lithium battery comprising:
a substrate; and
the solid-state ion conductor of claim 1 disposed on a surface of the substrate.

21. A lithium battery comprising:
a positive electrode;
a negative electrode comprising lithium, a lithium alloy, or a combination thereof; and
the solid-state ion conductor of claim 1 between the positive electrode and the negative electrode.

22. A method of preparing a solid-state ion conductor, the method comprising:
providing a precursor mixture comprising a lithium precursor, a nitrogen precursor, a chlorine precursor, and an X precursor; and
treating the precursor mixture to prepare a compound of Formula 1,
wherein the solid-state ion conductor comprises a compound represented by Formula 1, $$Li_{3a+b-(c*n)}N_aCl_bX_c \quad \text{Formula 1}$$

wherein, in Formula 1,
X comprises an anion having an average oxidation state of n; where −3≤n≤−1, and comprises S; and
1≤a≤4, 1≤b≤3, 0<c≤3; and 4.8≤(a+b+c)≤5.2.

23. The method according to claim 22, wherein the treating the precursor mixture comprises
mechanochemical milling of the precursor mixture; or
heat-treating the precursor mixture at 25° C. to 800° C., to prepare the compound of Formula 1.

24. The method according to claim 23, wherein the heat-treating comprises heating from 300° C. to 700° C. in an inert gas.

25. The method according to claim 23, further comprising disposing the compound of Formula 1 on a substrate.

* * * * *